(No Model.)

L. L. DAVIS.
HACK SAW FRAME.

No. 371,438. Patented Oct. 11, 1887.

Attest:
Court A Cooper
G. M. Chamberlain.

Inventor:
Leonard L. Davis
By Chapin & Co.
Attys

United States Patent Office.

LEONARD L. DAVIS, OF SPRINGFIELD, MASSACHUSETTS.

HACK-SAW FRAME.

SPECIFICATION forming part of Letters Patent No. 371,438, dated October 11, 1887.

Application filed May 2, 1887. Serial No. 236,772. (No model.)

*To all whom it may concern:*

Be it known that I, LEONARD L. DAVIS, a citizen of the United States, residing at Springfield, in the county of Hampden and State of Massachusetts, have invented new and useful Improvements in Hack-Saw Frames, of which the following is a specification.

This invention relates to saw-frames, and pertains particularly to improvements in hack-saw frames for jewelers' use; and the invention consists in the peculiar construction and arrangement of the saw-frame and means connected therewith for securing the saw in the frame, all as hereinafter fully described, and pointed out in the claims.

Figure 1:
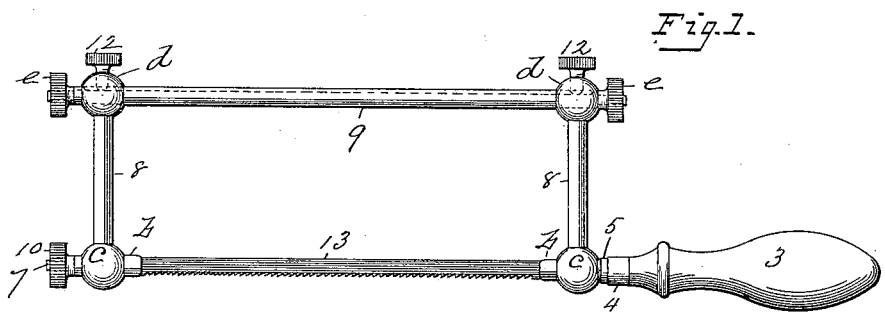
Figure 2:
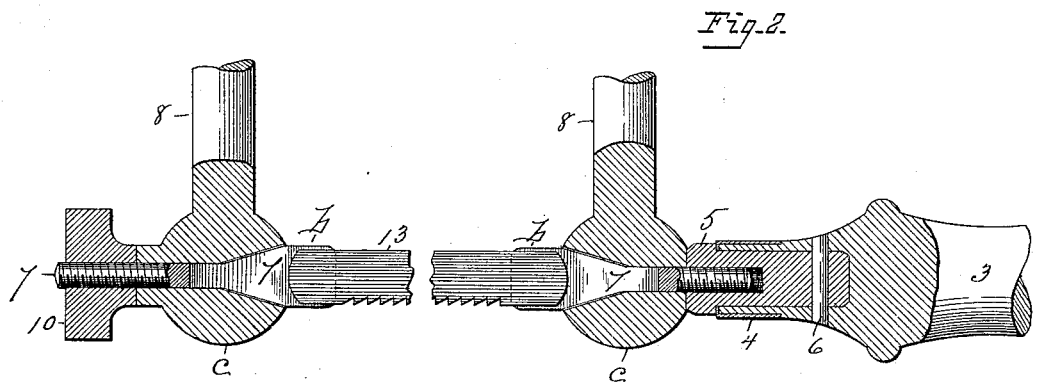
Figure 3:
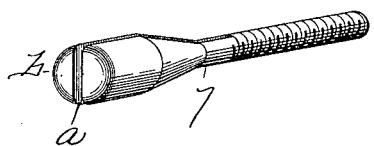

In the drawings forming part of this specification, Figure 1 is a side elevation of a hack-saw frame constructed according to my invention, showing a saw therein. Fig. 2 is a side elevation of portions of the saw-frame, partly in section, and parts of a saw, all as hereinafter fully described. Fig. 3 is a perspective view of a detail part, hereinafter described.

In the drawings, 3 indicates the handle of the saw-frame, having the usual ferrule, 4, on one end, and having fixed and secured in said end the metallic nut 5 by a pin, 6, passing through said handle and nut, as shown in Fig. 2. The said nut 5 is operated by the handle 3, to be screwed onto the screw-threaded shank of the saw-clamp 7, said clamp being illustrated in Fig. 3 in perspective view, and being shown in Fig. 2 with one side thereof broken off. The saw-clamp 7 is a suitable metallic piece having its larger end divided by a slot, *a*, and having that portion thereof between its head *b* and its screw-threaded shank tapered, or of cone shape, as shown.

The saw-frame parts which are attached to the handle 3 consist of two metallic arms, 8, having enlarged ends *c* and *d*, preferably of spherical form, and a bar, 9, constituting the back of the frame, which is also of metal, and has a longitudinal groove in its upper side, as indicated by a dotted line on said back. The spherical ends *c* of the arms 8 are both perforated transversely, so that each may receive the said saw-clamp 7, said perforation in the heads *c* being partly tapered and partly straight, as shown in Fig. 2, in order to adapt it to the outward form of the tapered portion of the clamp and the straight part of its screwed shank which immediately adjoins said tapered portion. One of the spherical ends *c* of said arms 8 is interposed between the nut 5 in the handle 3 and the head of one of the clamps 7, and the like end of the other arm, 8, between a nut, 10, and the head of a second clamp, 7, at the opposite end of the saw-frame, said nut 10 screwing onto the shank of one of the saw-clamps in the same manner that the nut 5 screws onto the shank of the second clamp.

The spherical ends *d* of the arms 8 are perforated transversely to receive the ends of the back or bar 9, and said arms are capable of movement toward and from each other on said back in order to adjust them to such degree of separation as may be required for saws of different lengths, and the arms 8 are secured in proper positions on the back 9 by the screws 12, which pass through the upper sides of the spherical heads *d*, and, entering said groove in the bar 9, are screwed against the base of the groove, thereby securing said arms on the bar and preventing them from turning on the latter. The heads *c* on the ends of said bar 9 are fixed on the ends of the latter, or are tightly screwed thereon after the arms 8 have been placed on said bar.

It is deemed preferable to construct the saw-frame with the arms 8 thereof adjustable on the back 9, as described, both for convenience and economy of construction, and to provide for any kind of adjustment of all the parts of the frame that may be required, as below described; but, if preferred, only one of said arms may be made adjustable on said back, (that being the one farthest from the handle,) and in that case the back and the arm nearest the handle would be made preferably of one piece of metal.

In attaching the saw 13 to the saw-frame the arms 8 are adjusted and secured at such a distance apart as will accommodate the length of the saw, and the ends of the latter are then inserted in the slotted ends of the heads *b* of the clamps 7, as shown in Figs. 1 and 2, and then the nuts 10 and the handle 3, to which nut 5 is secured, are both screwed against the sides of the heads *c* of said arms, thereby drawing the tapered or conical-shaped parts of the clamps forcibly into the head *c* and causing the heads of the clamps to be forced together and clamped against or upon the ends of the saw, thereby rigidly connecting said ends between the arms 8 of the frame.

Should a saw become broken in use, the broken saw can be connected in the frame with the same ease as a new one, for the reason that the clamps 7 are adapted to grasp a broken end, if desired.

A common construction of hack-saws is one in which each end of the saw has a pin-hole through it to attach it to a slotted stud on the frame, through which a pin passes transversely; and in the improved frame herein described saws having said pin-holes in their ends or not are with equal facility attached to said frame, and therein lies a great advantage in the use of the within-described saw-frame, for it is not required that the end of the saw or the broken end of the latter shall have a pin-hole made in it before it can be attached to the frame, for the slotted head of the clamp 7, as described, is adapted to receive and hold the end of a saw made as shown in Fig. 2— that is to say, without any pin-hole in it—and said clamps are very quickly operated to secure the ends of the saw or to disconnect them by turning the handle and the nut 10, as above described.

The endwise movement imparted to the clamps 7 by turning the handle 3 and the nut 10, as aforesaid, when the saw is being secured in the frame, imparts the desired tension to the latter, it being understood that the arms 8 are rigidly attached to the back 9.

What I claim as my invention is—

1. A hack-saw frame consisting of the back and two arms, substantially as described, combined with slotted cone-shaped saw-clamps, as 7, capable of an endwise movement in each of said arms, a nut, as 10, to operate one of said clamps, and a nut having the handle of the frame attached thereto to operate the second saw-clamp, substantially as set forth.

2. The back 9 of the saw-frame, having a longitudinal groove therein, combined with the arms 8, capable of a sliding movement on said back, and the screws 12 in the heads of said arms, whose ends enter said groove, substantially as set forth.

LEONARD L. DAVIS.

Witnesses:
G. M. CHAMBERLAIN,
H. A. CHAPIN.